United States Patent
Vidaillac

(10) Patent No.: US 7,373,108 B2
(45) Date of Patent: May 13, 2008

(54) SHARING METHOD AND APPARATUS USING A NON-PERMANENT COMMUNICATION LINK

(75) Inventor: Pierre Vidaillac, Bellefeuille (CA)

(73) Assignee: Minds Inc., Boisbriand, Québec (CA)

( * ) Notice: Subject to any disclaimer, the term of this patent is extended or adjusted under 35 U.S.C. 154(b) by 1075 days.

(21) Appl. No.: 10/392,313

(22) Filed: Mar. 20, 2003

(65) Prior Publication Data

US 2003/0211852 A1    Nov. 13, 2003

Related U.S. Application Data

(60) Provisional application No. 60/365,513, filed on Mar. 20, 2002.

(51) Int. Cl.
  *H04B 7/00*     (2006.01)
  *G06F 15/16*    (2006.01)
  *H04Q 7/20*     (2006.01)

(52) U.S. Cl. .............................. 455/41.2; 340/539.13; 455/456.1; 709/203

(58) Field of Classification Search ............ 340/539.13; 455/456.1–456.3, 456.5, 456.6, 465, 41.1, 455/41.2, 41.3; 701/207, 213; 709/203
See application file for complete search history.

(56) References Cited

U.S. PATENT DOCUMENTS

| | | | |
|---|---|---|---|
| 6,510,381 B2 * | 1/2003 | Grounds et al. ............. | 701/207 |
| 6,606,561 B2 * | 8/2003 | Flick .......................... | 701/213 |
| 2001/0034577 A1 | 10/2001 | Grounds et al. | |
| 2002/0016673 A1 | 2/2002 | Flick | |

FOREIGN PATENT DOCUMENTS

| WO | WO99/12140 | 3/1999 |
|---|---|---|
| WO | 0079727 | 12/2000 |
| WO | WO01/32480 | 5/2001 |

* cited by examiner

*Primary Examiner*—Harry S. Hong
(74) *Attorney, Agent, or Firm*—Ogilvy Renault, LLP

(57) ABSTRACT

A method and apparatus is described for sharing data among a plurality of devices using a wireless short-range transceiver and for ultimately transmitting at least one part of the shared data to a remote server using a data network transceiver. Each device further comprises a localization unit providing a geographic position of the device.

12 Claims, 5 Drawing Sheets

| DEVICE NUMBER | DEVICE INVOLVED | GEOGRAPHIC POSITION | TIME | ...... | |
|---|---|---|---|---|---|
| 3 | 3 | | | | |
| 3 | 1 | | | | |
| 3 | 10 | | | | |

FIGURE 4

SHARING METHOD AND APPARATUS USING A NON-PERMANENT COMMUNICATION LINK

This application claims priority of U.S. provisional patent application No. 60/365,513 that was filed Mar. 20, 2002 and entitled "Data sharing method and apparatus using a non-permanent communication link".

TECHNICAL FIELD

The present invention relates to a portable apparatus and method to locate and gather movement information of vehicles in the construction industry.

BACKGROUND OF THE INVENTION

More specifically, operations in the asphalt and cement concrete industries are real-time driven and knowing a position and a movement historic of vehicles used to deliver a product can improve efficiency. Beside, theft of heavy vehicles is really a problem in some areas.

Real time localization of vehicles in the construction industry has been first obtained through vocal communication with radio or cellular links with the vehicle's driver. A few years ago, the Global Positioning System (GPS) and the use of cellular networks to carry digital data have lead to the development of devices that can communicate their geographic position to Internet servers. Nevertheless, those solutions are not best fitted for the construction industry for technical and economical reasons.

Most of the solutions use a combination of GPS for providing geographic position and digital cellular or satellite technologies for providing communications. The digital cellular or satellite technologies apparatus are called, or can call, to transmit the geographic position of the vehicle. However, the above-mentioned devices, when used in the construction industry, suffer from many drawbacks as explained above.

Firstly, the devices are usually not portable; the devices may therefore not be easily removed and remounted on another vehicle. An installation of the device on the whole fleet of vehicles is therefore required. Usually a cost of 500$ to 1000$ is necessary per vehicle.

Secondly, the devices need an external source of power which require a lengthy setup.

Thirdly, a cellular coverage is not available everywhere on earth, creating therefore dead zones where no information from the device may be available.

A fourth drawback is the fact that satellite communication coverage, as well as a GPS coverage are not available in underground environments or in tunnels.

A fifth drawback is the fact that the cost of a communication using a satellite communication technology is still very high.

The cost to use a cellular technology may also be very high if many vehicles use it, a subscription cost located between 20$ and 50$ per month and per vehicle is necessary.

Finally, "anti-theft" in vehicle is not efficiently enough implemented.

There is therefore a need for a device that will overcome the above-mentioned drawbacks.

SUMMARY OF THE INVENTION

Therefore, it is an object of the invention to provide an apparatus and method to implement a remote vehicle localization and movement tracking that is portable and can be removed and remounted.

It is an object of the invention to provide an apparatus and method to implement a remote vehicle localization and movement tracking that does not need an external power supply.

Yet, it is an object of the invention to provide an apparatus and method to implement a remote vehicle localization and movement tracking that use a non-permanent cellular coverage.

Yet, it is an object of the invention to provide an apparatus and method to implement a remote vehicle localization and movement tracking that use a non-permanent satellite coverage.

Yet, it is another object of the invention to provide an apparatus and method to implement a remote vehicle localization and movement tracking that use but can operate without a GPS coverage.

Yet, it is another object of the invention to provide an apparatus and method to implement a remote vehicle localization and movement tracking that implement an efficient "anti-theft" system in order to protect vehicles.

Yet another object of the invention is to provide a method for sharing data among many clients using a device, the data comprising a geographic position of the device.

Yet another object of the invention is to provide an apparatus for sharing data among more than one clients without a permanent communication link, the data comprising a geographic position.

According to an aspect of the invention, there is provided a data sharing apparatus for sharing and transmitting data to a remote server the data comprising at least one geographic position, the data sharing apparatus comprising a processing unit, a localization device providing a geographic position of the data sharing apparatus to the processing unit, a collected data database storing the geographic position of the data sharing apparatus provided by the processing unit together with at least an indication of a temporal location, a wireless short-range transceiver connected to the processing unit and providing a short-range wireless connection to at least one data sharing apparatus, the shortrange wireless connection being used to transmit at least one part of the stored geographic position of the data sharing apparatus together with the indication of the temporal location and an identifier identifying a transmitting data sharing apparatus and a data network transceiver connected to the processing unit and providing a connection to a remote server for sending at least one part of the collected data database to the remote server, wherein the provided short-range wireless connection between more than one data sharing apparatus enables the sharing of data that will further be transmitted to the remote server using the data network transceiver of one of the more than one data sharing apparatus, enabling a management of the transmission of data between each of the data sharing apparatus and the remote server.

According to another aspect of the invention, there is provided a method for sharing and transmitting data from one data sharing apparatus of a plurality of data sharing apparatus to a remote server the data comprising at least one geographic position, the method comprising receiving a geographic position of the data sharing apparatus using a localization device, storing in a collected data database the received geographic position with at least an indication of a temporal location, sharing the stored geographic position with the indication of the temporal location with at least one of the plurality of data sharing apparatus using a short-range wireless connection and transmitting at least one part of the collected data database with a remote server using a data network transceiver, wherein the transmitting of the at least one part of the collected data database is performed by one of the plurality of data sharing apparatus, enabling to select a versatile way to sent the at least one part of the collected data database to the remote server.

BRIEF DESCRIPTION OF THE DRAWINGS

Further features and advantages of the present invention will become apparent from the following detailed description, taken in combination with the appended drawings, in which:

FIG. 4 is an example of a table of data that may be shared.

It will be noted that throughout the appended drawings, like features are identified by like reference numerals.

DETAILED DESCRIPTION OF THE PREFERRED EMBODIMENT

Figure 1:
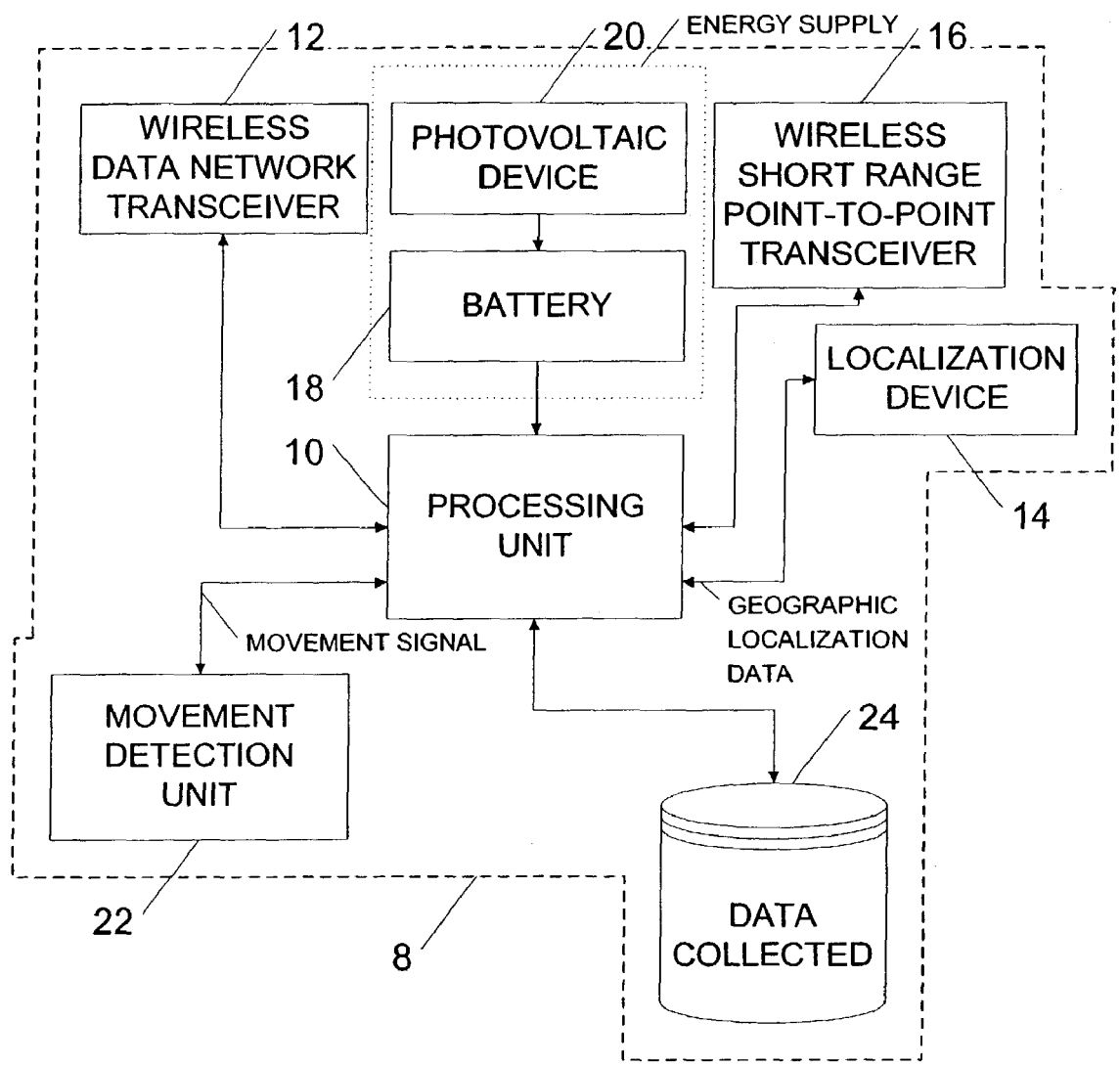
FIG. 1 shows the preferred embodiment of the apparatus.

Now referring to FIG. 1, there is shown the preferred embodiment of the invention.

In the preferred embodiment of the invention, a data sharing communication apparatus 8 comprises a processing unit 10, a wireless data network transceiver 12, a geographic localization device 14, a wireless short range point-to-point transceiver 16, a battery 18, a photovoltaic device 20, a motion detection unit 22 and a collected data database 24.

In the preferred embodiment of the invention, the processing unit 10 is a Motorola Coldfire. Still in the preferred embodiment, Linux is used as an operating system for the data sharing communication apparatus 8.

The wireless data network transceiver 12 provides a communication link between the data sharing apparatus and a central server unit as explained below. The wireless data network transceiver 12 may be a satellite data packet transceiver, a cellular transceiver or the like. In the preferred embodiment of the invention, the wireless data network transceiver 12 is a non-permanent communication link that will connect to the central server unit at a predetermined time as explained below. In the preferred embodiment of the invention, the wireless data network transceiver 12 is used to connect an Internet Service Provider (ISP). The central server unit is reached via the Internet connection provided by the ISP in the preferred embodiment of the invention. In an alternative embodiment, the data network transceiver is a cable modem transceiver.

The geographic localization device 14 provides a geographic position. In the preferred embodiment of the invention, the geographic localization device 14 is a Global Positioning System (GPS); in another embodiment of the invention, the geographic localization device 14 is a Loran-C receiver. The geographic localization device 14 provides a geographic position of the data sharing communication apparatus 8 to the processing unit 10, the geographic position is stored together with the corresponding time in the collected data database 24.

The wireless short-range point-to-point transceiver 16 is connected to the processing unit 10 and provides a communication link between two data sharing communication apparatus 8. In the preferred embodiment, the wireless short-range point-to-point transceiver 16 has an operating range of a few hundred meters. Such short operating range enables a localization of one of the two data sharing communication apparatus 8 when the geographic position of the other data sharing communication apparatus is unknown. As explained below, the wireless short-range point-to-point transceiver 16 is used to share data between two data sharing communication apparatus 8.

The data sharing communication apparatus 8 further comprises a battery 18 connected to a photovoltaic device 20. The battery 18 supplies the necessary electrical power for the safe operating of the data sharing communication apparatus 8. The battery 18 is charged by the photovoltaic device 20 in the preferred embodiment of the invention.

The data sharing communication apparatus 8 further comprises a motion detection unit 22. The motion detection unit 22 provides an indication of a movement if any is detected. The motion detection unit 22 may be used in order to use the data sharing communication apparatus 8 as an "anti-theft" device as explained below. In the preferred embodiment of the invention, the motion detector unit 22 comprises is an accelerometer.

The data sharing communication apparatus 8 further comprises a collected data database 24. As explained below, a data sharing communication apparatus 8 may share information with another data sharing communication apparatus 8. After such sharing, as explained below, the shared information is stored in the collected data database 24. In the preferred embodiment of the invention, the collected data database 24 comprises the geographic position data acquired by the data sharing communication apparatus 8. In the preferred embodiment of the invention, the collected data database 24 is a flash memory.

In the preferred embodiment of the invention, a vehicle to be tracked is equipped with the data sharing communication apparatus 8 which is magnetically fixed to the vehicle.

The data sharing communication apparatus 8 is fixed horizontally, and maintained in place, on a flat magnetic surface of the vehicle through its magnetic socket. The antenna of the localization device 14 is oriented toward the sky.

Figure 2:
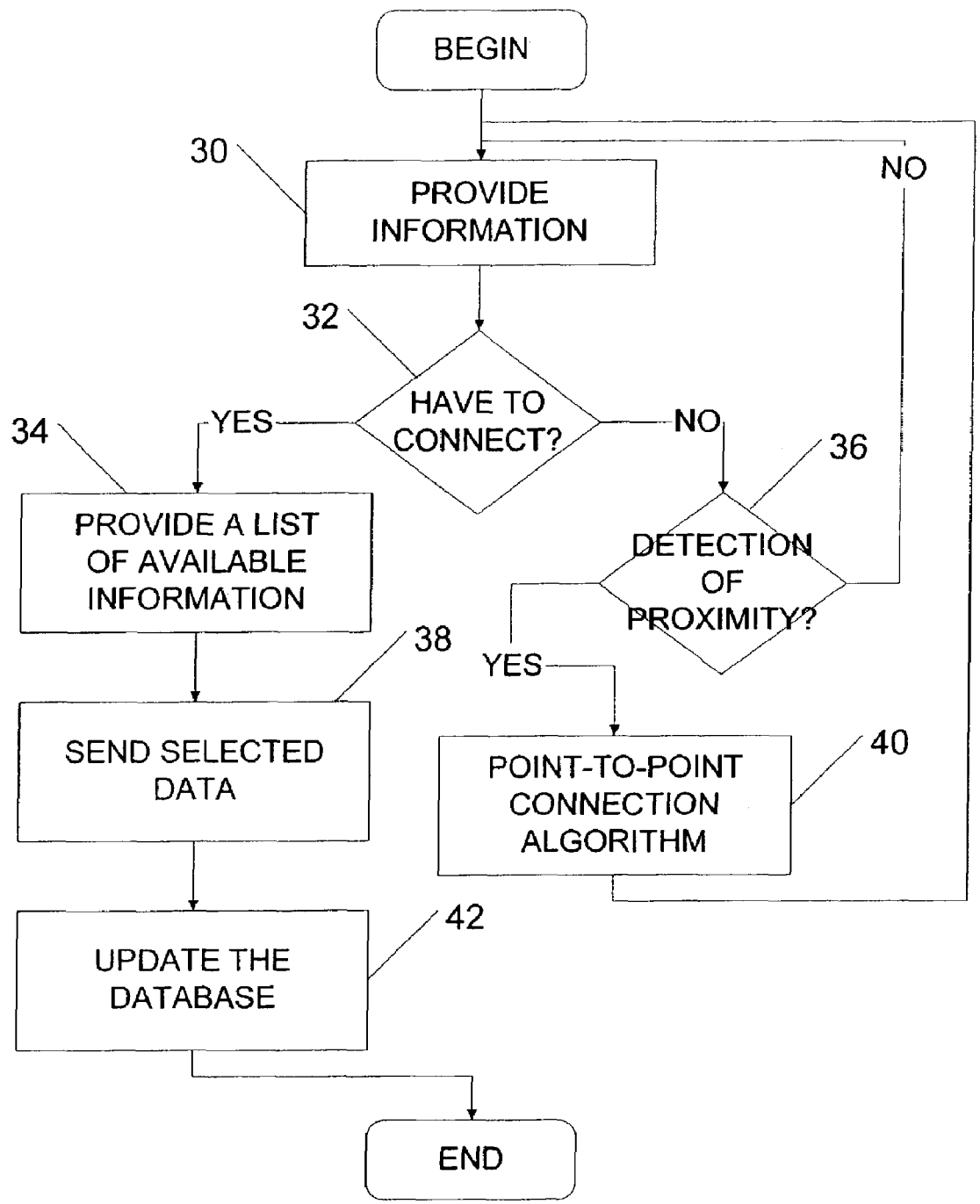
FIG. 2 shows a flow chart of the operations performed by the apparatus in the preferred embodiment of the invention.

Now referring to FIG. 2, there is shown a flow chart of the operation performed by the data sharing communication apparatus 8.

As soon as the data sharing communication 8 is powered, the apparatus tries to connect, through its wireless short-range transceiver 16, to another apparatus, forming a mobile ad hoc wireless network. Beside, fixed and wired to the Internet devices, called wired beacons, may also participate to the mobile ad hoc network. Once connected to the MANET (Mobile Ad hoc NETwork), the data sharing communication apparatus establishes itself as candidate to be a gateway toward the Internet through its cellular connection. If the data sharing communication apparatus 8 is alone, the data sharing communication apparatus 8 is the Internet gateway of itself. The protocol governing the MANET incorporates a gateway election algorithm based on the connection cost to the Internet as well as the quality of signal. Each apparatus is equipped with a cellular modem which uses a per kilo octet or per minute charge contract with a cellular operator.

According to step 30, an algorithm checks, using various parameters, if the data sharing communication apparatus 8 should provide its data collected in the collected data database 24 to the central server unit. The various parameters comprise for instance the size of the collected data database 24 or the age of the data comprised in the collected data database 24.

According to step 32, a check is performed to find out if a connection should be performed by the data sharing communication apparatus 8 to the central server unit.

The choice on whether a connection should be performed may depend on various parameters such as the connection cost to the Internet, the quality of a wireless signal, the type of information located in the collected data database 24 and the age of the data comprised in the collected data database 24.

If a connection should be performed with the central server unit and according to step 34 of FIG. 2, a list of available data in the collected data database 24 is provided to the central server unit using the wireless data network transceiver 12.

The central server unit then checks which information is needed. In the preferred embodiment of the invention, the information needed is the information that the central server unit does not already have.

Still referring to FIG. 2 and according to step 38, the selected information is transmitted to the central server unit using the wireless data network transceiver 12 via the Internet connection.

In another embodiment of the invention, the communication between the wireless data network transceiver 12 and the central server unit are encrypted.

According to step 42, the collected data database 24 is updated. In the preferred embodiment of the invention, the selected information transmitted to the central server unit is removed from the collected data database 24 in order to avoid traffic congestion.

According to step 36, a check is performed in order to locate a second data sharing communication apparatus 8 in the vicinity of the first data sharing communication apparatus 8. In the preferred embodiment of the invention, a detection of the second data sharing communication apparatus 8 is performed using the wireless short range point-to-point transceiver 16.

Still referring to FIG. 2 and a according to step 40, a point-to-point connection algorithm is implemented if the second data sharing communication apparatus 8 is detected in the vicinity of the first data sharing communication apparatus 8.

Figure 3:
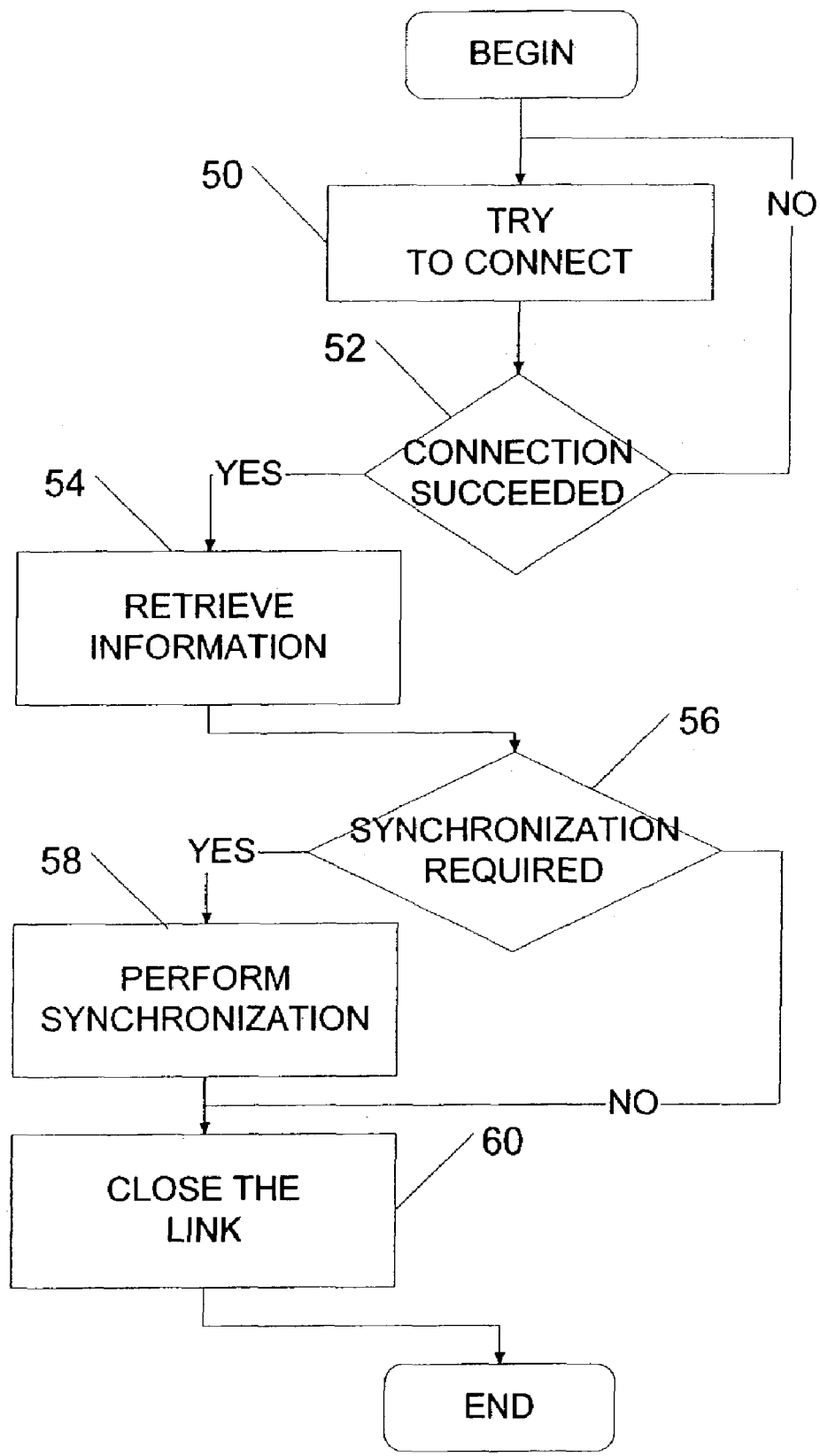
FIG. 3 shows a flow chart of the operations performed when information is shared between two devices according to the preferred embodiment of the invention.
Figure 5:
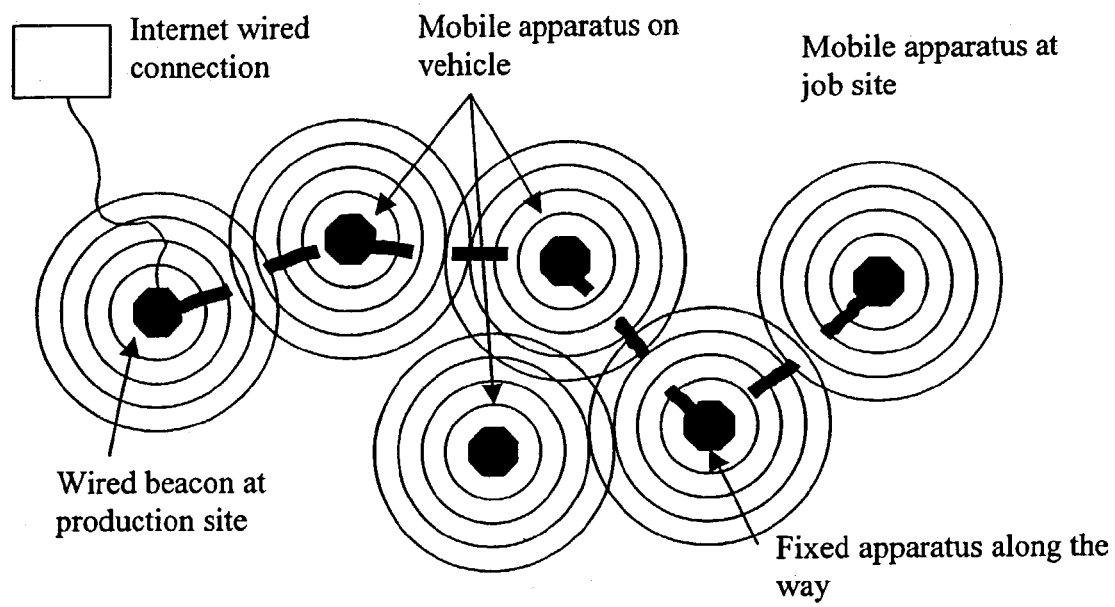
FIG. 5 shows an example of a network created using a plurality of devices in the preferred embodiment of the invention.

Now referring to FIG. 3, there is shown a flow chart which shows the point-to-point connection algorithm.

According to step 50, the first data sharing communication apparatus 8 tries to connect to the second data sharing communication apparatus 8 using the wireless short range point-to-point transceiver 16. According to step 52, a test is performed in order to check if the connection is successful. A connection is successful if a correct handshake is performed.

If the connection is successful and according to step 54, the first and the second data sharing communication apparatus 8 retrieve a list of available data. The first data sharing communication apparatus 8 retrieves a list of available data in the collected data database 24 of the second data sharing communication apparatus 8 while the second data sharing communication apparatus 8 retrieves a list of available data in the collected data database 24 of the first data sharing communication apparatus 8.

According to step 56, a check is performed in order to see if a synchronization is required by the first and the second data sharing communication apparatus 8.

Still referring to FIG. 3 and according to step 58, synchronization is performed. The first, as well as the second data sharing communication apparatus 8 collect data that they do not have in their respective collected data database 24. The data is transmitted using their respective wireless short-range point-to-point transceiver 16.

In another embodiment of the invention, the transfer of some data may be discarded if the data is too old for instance. It will be appreciated by someone skilled in the art that various algorithms may be implemented to limit the transfer of certain type of data and avoid a database congestion.

Now referring to FIG. 4, there is shown an example of the data comprised in the collected data database 24. Each line of the table provided in FIG. 4 shows an entry in the collected data database 24.

In the preferred embodiment of the invention, a first field of the collected data database 24 is dedicated to the identification of the data sharing communication apparatus 8 which owns the data. A second field of the collected data database 24 comprises the identification of the data sharing communication apparatus involved in a geographic positioning measure. A third field of the collected data database 24 comprises a measured geographic position. A fourth field of the collected data database 24 comprises the time of the measure.

As shown in FIG. 4, many fields may be added depending on the application intended. It will be appreciated by someone skilled in the art that a field may comprise a pointer to a binary file.

As explained above, the data sharing communication apparatus 8 comprises a motion detection unit 22. The motion detection unit 22 may be used in combination with the other elements of the data sharing communication apparatus 8 in order to provide an "anti-theft" device.

The data sharing communication apparatus 8 may be set in "anti-theft" mode. In such mode and if the motion detection unit 22 detects a motion, the data sharing communication apparatus 8 may report to the central server unit using the point-to-point transceiver 16, if another data sharing communication apparatus 8 is located in the vicinity of the first data sharing communication apparatus 8. The communication may in such case report an emergency code, having a high priority.

The data sharing communication apparatus 8 may alternatively use the wireless data network transceiver 12 to report to the central server unit the emergency code having a high priority. In another embodiment, the data sharing communication apparatus 8 may provide in such mode a "heartbeat" signal with a certain, predetermined, frequency.

Embodiment of the Invention in the Construction Industry

As explained below, it is possible to gain advantage from the use of the present invention in the field of the construction industry. In such field, a plurality of data sharing communication apparatus 8 are used. At least one part of the plurality of the sharing communication apparatus are used in a static mode, i.e. they are placed on a site; the other part of the plurality of the sharing communication apparatus are installed in trucks used as explained below.

In the case of the construction industry and more precisely in the case of the spreading of asphalt on a building site, two types of moving units are involved: trucks dedicated to the transportation of the asphalt from an asphalt production site to the building site and pavers which are dedicated to the spreading of the transported asphalt on the building site.

It is more important to know the relative position of the trucks with respect to the pavers rather than knowing the exact geographic position of each truck and each paver. In the case of the asphalt spreading, it is possible to divide the fleet of trucks into the following categories.

A first category relates to trucks which are waiting for an asphalt loading on the asphalt production site.

A second category relates to trucks which are loaded with asphalt and which are waiting on the asphalt production site; it will be noted by someone skilled in the art that this second category is not a very large category.

A third category relates to trucks which are being driven to the building site.

A fourth category relates to trucks which have arrived on the building site.

A fifth category relates to trucks which unload the asphalt; these trucks are located close to the truck dedicated for the spreading of the asphalt.

A sixth category relates to trucks which have already unloaded the asphalt but which are located close to the truck dedicated for the spreading of the asphalt.

A seventh category relates to trucks which are being driven back to the asphalt production site.

It will be appreciated that, even if the localization device 14 cannot provide its geographic position information, it is still possible to determine to which category a truck belongs.

Furthermore, it is possible to determine if a truck is driving to the building site.

It is also possible to determine which trucks have arrived on the building site and are already loaded.

During the unloading, a truck is close to the paver; using the wireless point-to-point short-range radio, it is possible to find out the distance between the truck and the paver. If the distance between the truck and the paver is less that a predetermined threshold value, it is possible to consider that the truck is unloading its asphalt. In another embodiment of the invention, in the case where the wireless short range point-to-point transceiver 16 has a transmitting power that avoids a precise positioning, the data sharing communication apparatus 8 may comprise a second wireless short range point-to-point transceiver 16. In such embodiment, the second wireless short-range point-to-point transceiver 16 has a very low transmitting power enabling only very close transmissions.

It is also possible to determine which trucks have arrived on the building site and are now unloaded.

Finally, it is possible to determine which trucks are heading back to the asphalt production site.

It is therefore possible to discriminate the seven above-mentioned categories without a working localization device 14. However, if the localization device 14 works, it will be used to gain the advantage of having a precise geographic position of each truck.

As the data sharing communication apparatus 8 are portable, it is possible to install them on the fly only in equipments requiring a tracking.

The data sharing communication apparatus 8, being either static, when located in a fixed place, or mobile, when mounted on a truck, may choose a single data sharing communication apparatus 8 which will be a gateway to the internet via the wireless data network transceiver 12.

It will be appreciated by someone skilled in the art that the wireless data network transceiver 12 of the chosen gateway may alternatively be an 802.11b-enabled device that will take advantage of the high bandwidth provided by the standard.

Bearing in mind that the invention will be of great advantage if communication costs are maintained at a low level, the gateway will be chosen according to the Internet connection cost. In the preferred embodiment of the invention, the gateway will have a fixed-cable connection.

As explained above the data shared between the data sharing communication apparatus 8 are sent to the central server unit upon request in one embodiment of the invention. In another embodiment of the invention, the data shared between the data sharing communication apparatus 8 are sent to the central server unit at a predetermined frequency.

In another embodiment of the invention, the data shared between the data sharing communication apparatus 8 are sent to the central server unit when the transmission cost is located below a certain threshold enabling an efficient cost management.

The data provided to the central server unit will be further used and compiled for later retribution of the owners of the trucks or the truck drivers for instance.

In this embodiment of the inventions the following parameters are used to send the shared data to the central server unit.

A first parameter is the existence of an available cable connection, either directly or using the available network of data sharing communication apparatus 8.

A second parameter is the existence of a cellular connection which is already operating between a data sharing communication apparatus 8 and an Internet Service Provider and which is reachable.

A third parameter is the age of the shared data. A newly shared data will have a priority that will first increase to reach a maximum and then decrease after a certain period. In the preferred embodiment of the invention, it is possible to fully configure the priority of information with respect to its age as already explained above.

A fourth parameter is the cost of the Internet link.

As explained above, each data sharing communication apparatus 8 will share its data with neighboring data sharing communication apparatus 8.

In the case where no cellular network is available in the operating site where the trucks are moving, it is possible to create a network of static data sharing communication apparatus 8 that will relay information shared.

It will be appreciated by someone skilled in the art that the central server unit may choose to get information from a selected data sharing communication apparatus 8. The central server unit using the other data sharing communication apparatus 8 will try to track down the selected data sharing communication apparatus 8.

In the case where the other data sharing communication apparatus 8 are not able to provide information about the selected data sharing communication apparatus 8, the central server unit may try to reach the data sharing communication apparatus 8 using its wireless data network transceiver 12.

Using the motion detection unit 22 and as explained below, the data sharing communication apparatus 8 may be protected against stealing.

The data sharing communication apparatus 8, when set in "anti-thief" mode, will provide, at regular intervals, a signal directed to the central server unit in the preferred embodiment of this application. The signal is sent using the wireless short-range point-to-point transceiver 16 if a link is available or using the wireless data network transceiver 12. The signal comprises the geographic position or an estimate of the geographic position if the geographic position is not available. If a movement is detected, the data sharing communication apparatus 8 stop transmitting the signal and begin transmitting an alert message with a high priority in the preferred embodiment of the invention. The lost of a regular signal in an "anti-thief" mode is considered to be a steal.

The embodiments of the invention described above are intended to be exemplary only. The scope of the invention is therefore intended to be limited solely by the scope of the appended claims.

We claim:

1. A data sharing apparatus for sharing and transmitting data to a remote server, the data comprising at least one geographic position, the data sharing apparatus comprising:
   a processing unit;
   a localization device providing a geographic position of the data sharing apparatus to the processing unit;
   a collected data database storing the geographic position of the data sharing apparatus provided by the processing unit together with corresponding time;
   a wireless short-range transceiver connected to said processing unit and providing a short-range wireless connection to another one of said data sharing apparatus, the short-range wireless connection being used to transmit at least one part of said stored geographic position of the data sharing apparatus together with the corresponding time and an identifier identifying a transmitting data sharing apparatus; and
   a data network transceiver connected to said processing unit and providing a connection to a remote server for sending at least one part of the collected data database, to said remote server based on a priority, the priority being dependent on the corresponding time;
   wherein said provided short-range wireless connection between more than one data sharing apparatus enables the sharing of data that will further be transmitted to said remote server using the data network transceiver of one of the more than one data sharing apparatus, enabling a management of the transmission of data between each of the data sharing apparatus and said remote server, the management being dependent on the priority.

2. The apparatus as claimed in claim 1 wherein the processing unit is programmed to hold the at least one part of the collected data database to be sent to said remote server for a predetermined amount of time.

3. The apparatus as claimed in claim 1, wherein said processing unit selects the at least one part of the collected data database to be sent to said remote server, the at least one part of the collected data being selected being not available at said remote server.

4. The apparatus as claimed in claim 1, wherein the data network transceiver is a wireless data network transceiver.

5. The apparatus as claimed in claim 1, wherein the data network transceiver is a cable modem transceiver.

6. The apparatus as claimed in claim 1, wherein the wireless short-range transceiver is a point-to-point short-range transceiver.

7. The apparatus as claimed in claim 1, further comprising a motion detection unit connected to said processing unit and providing a motion signal when a motion of the data sharing apparatus is detected.

8. The apparatus as claimed in claim 1, further comprising a photovoltaic device providing a current to said data sharing apparatus.

9. A method for sharing and transmitting data from one data sharing apparatus of a plurality of data sharing apparatus to a remote servers, the data comprising at least one geographic position, the method comprising:
   receiving a geographic position of the data sharing apparatus using a localization device;
   storing in a collected data database said received geographic position with a corresponding time;
   determining a priority associated to the geographic position, the priority being dependent on the corresponding time;
   sharing said stored geographic position and said corresponding time with another one of said plurality of data sharing apparatus using a short-range wireless connection, said sharing being dependent on said priority; and
   transmitting at least one part of said collected data database to a remote server using a data network transceiver, said at least one part being chosen according to the priority;
   wherein said transmitting of said at least one pad of said collected data database is performed by one of said plurality of data sharing apparatus, enabling to select a versatile way to send said at least one pad of said collected data database to said remote server.

10. The method as claimed in claim 9, wherein the transmitting of at least one pad of said collected data database with a remote server using a data network transceiver comprises sending a list of available data in said collected data database, selecting at least one pad of said available data, in said list sent, by said remote server and transmitting said at least one pad of said available data selected to said remote server.

11. The method as claimed in claim 9, wherein the determining of the priority comprises at least one of: evaluating an age of the geographic position and determining an identity of the data sharing apparatus associated to the geographical position.

12. The apparatus as claimed in claim 1, wherein at least one of the data network transceiver and the wireless short-range transceiver comprises means for determining the priority by at least one of: evaluating an age of the geographic position and by determining an identity of the data sharing apparatus associated to the geographical position.

* * * * *